(12) United States Patent
Cheng et al.

(10) Patent No.: US 9,582,041 B2
(45) Date of Patent: Feb. 28, 2017

(54) TOUCH-CONTROL DISPLAY AND FABRICATION METHOD THEREOF

(71) Applicant: SiPix Technology, Inc., Taoyuan (TW)

(72) Inventors: Hsiao-Lung Cheng, Taoyuan County (TW); Chi-Mao Hung, Hsinchu (TW); Wei-Min Sun, Taipei (TW); Hsiao-Yuh Wang, New Taipei (TW)

(73) Assignee: SiPix Technology, Inc., Taoyuan (TW)

( * ) Notice: Subject to any disclaimer, the term of this patent is extended or adjusted under 35 U.S.C. 154(b) by 0 days.

(21) Appl. No.: 14/288,411

(22) Filed: May 28, 2014

(65) Prior Publication Data

US 2014/0368753 A1 Dec. 18, 2014

(30) Foreign Application Priority Data

Jun. 13, 2013 (TW) .............................. 102120965 A (51) Int. Cl.
*G06F 3/044* (2006.01)
*G06F 3/041* (2006.01)
*G06F 1/16* (2006.01)

(52) U.S. Cl.
CPC ............ *G06F 1/1643* (2013.01); *G06F 3/044* (2013.01); *G06F 3/0412* (2013.01)

(58) Field of Classification Search
CPC ...... G06F 1/1643; G06F 3/044; G06F 3/0412; G06G 2203/04103
See application file for complete search history.

(56) References Cited

U.S. PATENT DOCUMENTS

| 8,106,324 | B2 | 1/2012 | Lai | |
| 2008/0062148 | A1* | 3/2008 | Hotelling | G02F 1/13338 345/174 |
| 2008/0129317 | A1* | 6/2008 | Oba | G06F 3/044 324/663 |
| 2009/0180069 | A1 | 7/2009 | Nishimura | |
| 2009/0273570 | A1* | 11/2009 | Degner | G06F 3/044 345/173 |
| 2010/0052700 | A1 | 3/2010 | Yano | |
| 2012/0242600 | A1* | 9/2012 | Chiou | G06F 3/044 345/173 |

(Continued)

FOREIGN PATENT DOCUMENTS

| CN | 101533186 A | 9/2009 |
| CN | 101666832 A | 3/2010 |

(Continued)

*Primary Examiner* — Lun-Yi Lao
*Assistant Examiner* — Ibrahim Khan
(74) *Attorney, Agent, or Firm* — Winston Hsu; Scott Margo (57) ABSTRACT

A touch-control display includes a first substrate having a first surface and a second surface opposite to the first surface, a display panel disposed on a side of the first surface of the first substrate, and a touch control panel disposed on a side of the second surface of the first substrate. The display panel includes a first transparent conductive layer disposed on the first surface of the first substrate, and the first transparent conductive layer is in contact with the first substrate. The touch control panel has a second transparent conductive layer disposed on the second surface of the first substrate, and the second transparent conductive layer is in contact with the first substrate.

6 Claims, 7 Drawing Sheets

(56) References Cited

U.S. PATENT DOCUMENTS

2013/0057943 A1    3/2013  Shih
2014/0124241 A1*   5/2014  Yau ..................... H05K 1/0289
                                                     174/250
2015/0220190 A1*   8/2015  Yashiro ................ G06F 3/0412
                                                     345/174

FOREIGN PATENT DOCUMENTS

| CN | 102016775 A   | 4/2011  |
| CN | 102262469 A   | 11/2011 |
| CN | 102736287 A   | 10/2012 |
| TW | 201116919     | 5/2011  |
| TW | I369534       | 8/2012  |
| TW | 201239695 A1  | 10/2012 |
| TW | M443223       | 12/2012 |
| TW | 201312243 A1  | 3/2013  |

* cited by examiner

TOUCH-CONTROL DISPLAY AND FABRICATION METHOD THEREOF

BACKGROUND OF THE INVENTION

1. Field of the Invention

The present invention is related to a touch-control display and a fabrication method thereof, and more particularly to a touch-control display with a thinner structure and its related fabrication method.

2. Description of the Prior Art

Touch panel, due to its human-machine interactive characteristic, has been widely used as the input interface of many apparatuses. Recently, since consumer electronic products are more and more popular, the category of applications of touch-control displays with the combination of touch-control function and display is continuously growing, such as mobile phone, global positioning system (GPS) navigator system, tablet PC, personal digital assistant (PDA) and laptop computer.

Based on the differences in structure of various types, the development of the out-cell type capacity touch-control displays is more matured. Conventionally, in the out-cell type touch-control display, sensing series are formed on a transparent substrate for fabricating a capacity touch panel, and then the capacity touch panel with the sensing series is attached onto the outer surface of a display panel for fabricating a touch-control display. Therefore, the touch-control display has several films, including one to two transparent substrates, one or several layers of sensing series of the capacity touch panel, one color filter substrate and one transistor substrate of the display panel, and polarizers, which limits the possibility of decreasing the whole thickness of the touch-control display. Furthermore, the stack of the several above-mentioned films also reduces the light transmittance efficiency and affects the display performance. As a result, it is till an important issue to design a thinner or lighter structure of touch-control display devices for manufacturers.

SUMMARY OF THE INVENTION

It is one of the objectives of the present invention to provide a touch-control display with a thinner structure and a fabrication method thereof in order to solve the above-mentioned problem of thickness improvement limitation and affected display performance of conventional touch-control display having a stack with so many films.

According to an embodiment of the present invention, the touch-control display includes a first substrate, a display panel and a touch panel. The first substrate includes a first surface and a second surface at two opposite sides of the first substrate. The display panel is disposed on the first surface of the first substrate, and the display panel includes a first transparent conductive layer that is disposed on the first surface of the first substrate and in contact with the first substrate. The touch panel is disposed on the second surface of the first substrate, and the touch panel includes a second transparent conductive layer that is disposed on the second surface of the first substrate and in contact with the first substrate.

According to the embodiment of the present invention, a fabrication method of the touch-control display is further provided. The fabrication method includes providing a first substrate that has a first transparent conductive layer and a second transparent conductive layer disposed on two opposite sides on the surfaces of the first substrate respectively, performing a patterning process to the second transparent conductive layer to form a plurality of sensors in the second transparent conductive layer such that the second transparent conductive layer serves as a sensor layer of a touch panel, and then successively forming a display medium layer and a display electrode layer on the side of the first transparent conductive layer opposite to the first substrate such that the first transparent conductive layer, the display medium layer and the display electrode layer compose a display panel.

According to another embodiment of the present invention, a touch-control display is further provided. The touch-control display includes a display panel and a touch panel. The display panel includes a first substrate having a first surface and a second surface disposed on two opposite sides of the first substrate. The display panel further includes a first transparent conductive layer and a second transparent conductive layer, wherein the first transparent conductive layer is disposed on the first surface of the first substrate and in contact with the first substrate and the second transparent conductive layer is disposed on the second surface of the first substrate and in contact with the first substrate. The touch panel is disposed on the second surface of the first substrate and includes a third transparent conductive layer disposed on a side of the second transparent conductive layer opposite to the first substrate, wherein the third transparent conductive layer serves as a sensor layer of the touch panel.

According to the embodiment of the present invention, a fabrication method of a touch-control display is further provided. The fabrication method includes providing a first substrate having a first transparent conductive layer and a second transparent conductive layer disposed on two opposite sides of the surfaces of the first substrate, and successively forming a display medium layer and a display electrode layer on a side of the first transparent conductive layer opposite to the first substrate to enable the first transparent conductive layer, the display medium layer and the display electrode layer to form a display panel. Further, a second substrate having a third transparent conductive layer thereon is provided to be fixed on the second transparent conductive layer such that the third transparent conductive layer is disposed on a side of the second substrate opposite to the second transparent conductive layer, wherein the second substrate and the third transparent conductive layer compose a touch panel.

According to the present invention, a substrate with the first transparent conductive layer and the second transparent conductive layer on its two surfaces respectively is used as the base of the touch-control display, wherein the first transparent conductive layer is used as the element of the display panel and the second transparent conductive layer is used as a touching sensor of the touch panel or a shielding layer. Accordingly, the whole thickness of the touch-control display can be reduced, and the display performance of the display panel in the touch-control display can be further improved. Furthermore, the material cost and fabrication process can be also saved.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
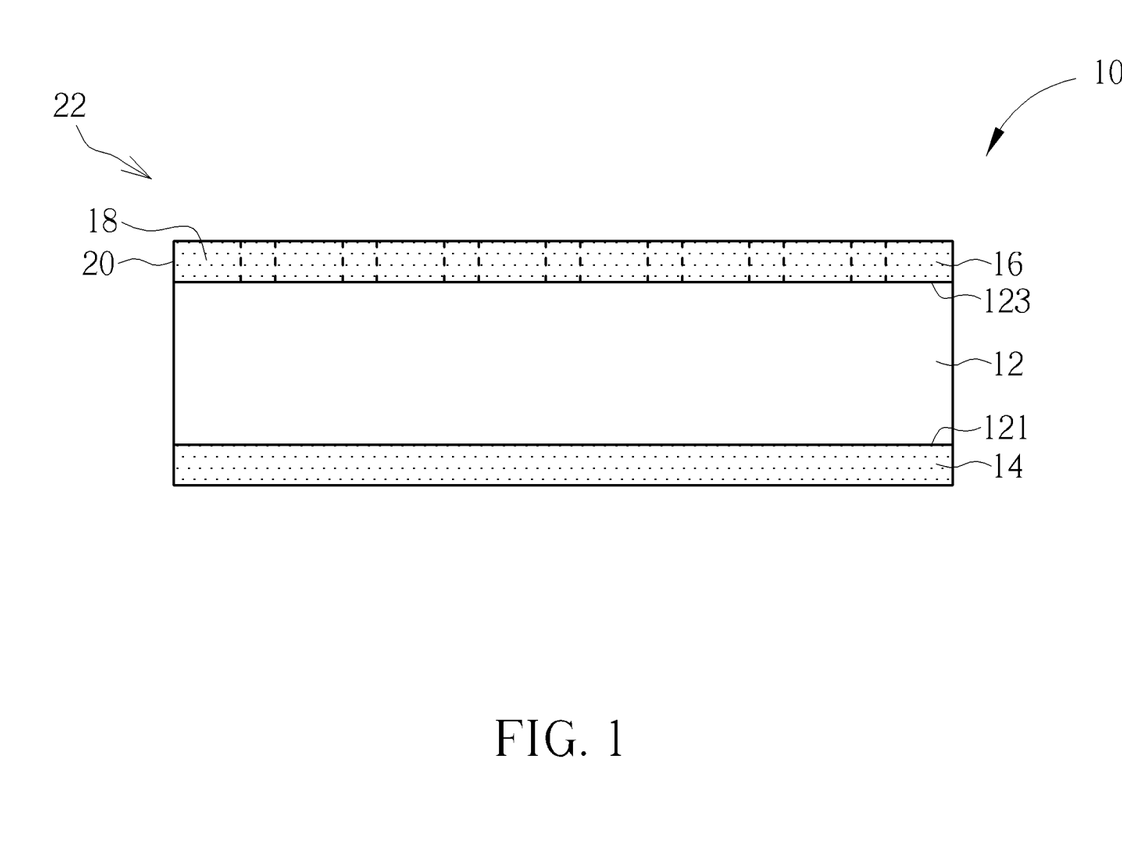
FIG. 1 to FIG. 2 are schematic diagrams showing the processes of the fabrication method of a touch-control display according to a first embodiment of the present invention.
Figure 2:
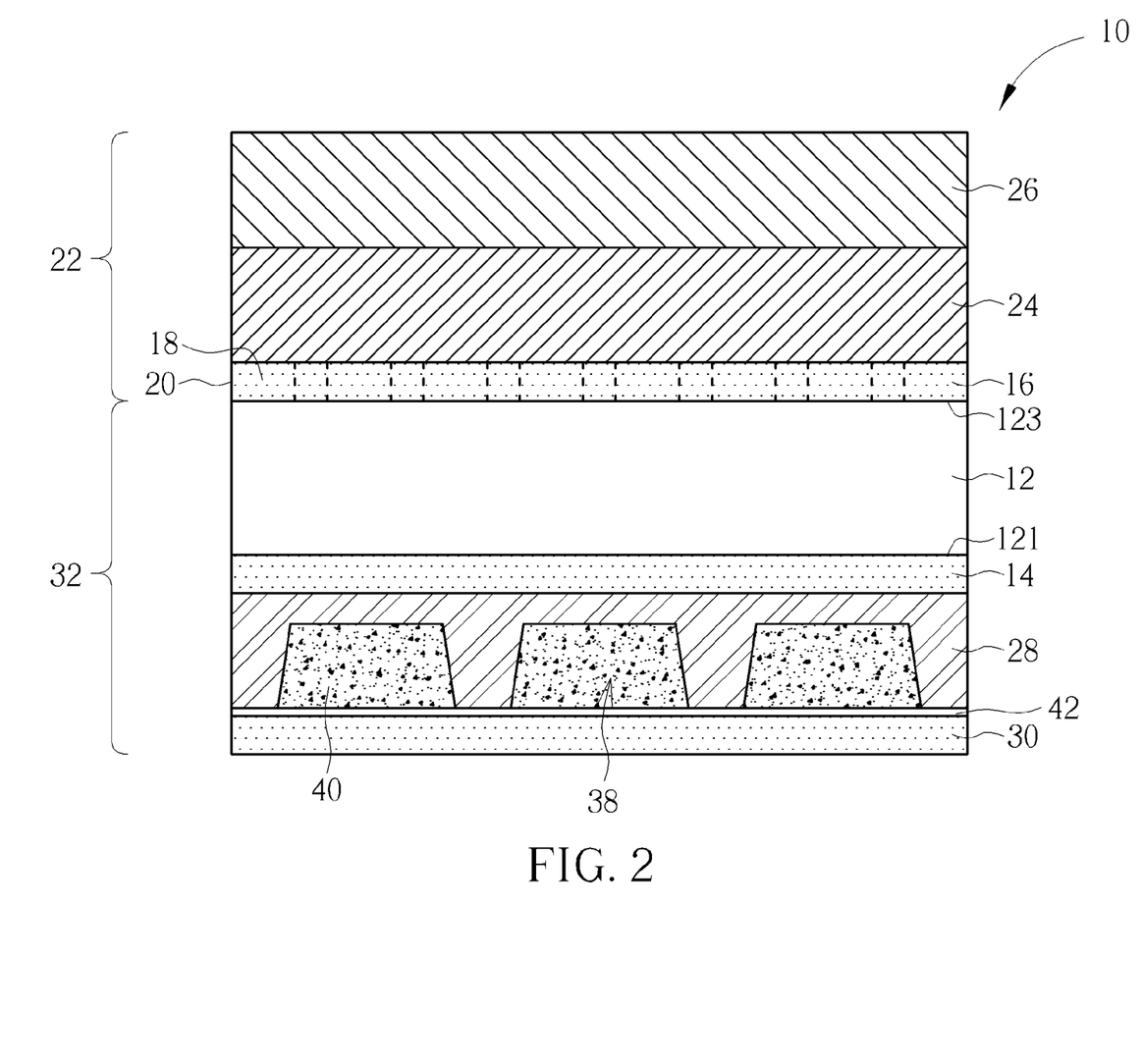

Referring to FIG. 1 to FIG. 2, FIG. 1 to FIG. 2 are schematic diagrams showing the processes of the fabrication method of a touch-control display according to a first embodiment of the present invention. As shown in FIG. 1, in the fabrication of the present invention touch-control display 10 according to the first embodiment, a first substrate 12 with transparency is first provided, wherein the first surface 121 and the second surface 123 are at two opposite sides of the first substrate 12 respectively. On the surfaces of the first substrate 12, a first transparent conductive layer 14 and a second transparent conductive layer 16 are disposed on the first surface 121 and the second surface 123 respectively. The first substrate 12 may be a flexible substrate, such as a polyethylene terephthalate (PET) film, whose thickness may be about 125 micrometers (μm), but not limited thereto. In other embodiments, the first substrate 12 may be a glass substrate whose thickness may be about 300 μm, but not limited thereto. The first transparent conductive layer 14 and the second transparent conductive layer 16 may respectively be an indium tin oxide (ITO) film, an indium zinc oxide (IZO) film, an aluminum zinc oxide (AZO) film, an indium tin zinc oxide (ITZO) film, a zinc oxide (ZnO) film, or a titanium-doped ZnO (TZO) film, or may respectively include any other conductive materials with transparent property. The first transparent conductive layer 14 and the second transparent conductive layer 16 may include the same or different materials, and their thickness may respectively be about 0.001 μm, but not limited thereto. The first transparent conductive layer 14 and the second transparent conductive layer 16 may be blanketly formed on the first surface 121 and the second surface 123 of the first substrate 12 respectively through coating or other processes.

Then, a patterning process is performed to the second transparent conductive layer 16 to form a plurality of sensors 18 in the second transparent conductive layer 16 such that the patterned second transparent conductive layer 16 has a plurality of sensors 18 to serve as a sensor layer 20 of a touch panel 22. The shapes and relative locations in the sensor layer 20 of the sensors 18 is not limited in the present invention, thus the dotted lines are used to represent the plural sensors 18 in the second transparent conductive layer 16 in FIG. 1. In this embodiment, the touch panel 22 has only one layer of the sensor layer 20, such that the sensors 18 in the second transparent conductive layer 16 may include, for example, the first sensor series and the second sensor series extending along a first direction and a second direction respectively, wherein the first and second sensor series isolatedly cross to each other on the second surface 123. The fabrication method in this embodiment may selectively further include a bridging process to electrically connect the sensors 18 in each of the first sensor series along the first direction or the second sensor series along the second direction, but not limited thereto. Selectively, the sensors 18 of this embodiment may only extend along one single direction. For example, the sensors 18 may have triangle-like shapes or have any structure and arrangement of various types of single layer sensors.

As shown in FIG. 2, a protection layer (not shown) may then be selectively formed on the surface of the second transparent conductive layer 16 to cover the second transparent conductive layer 16. In another aspect, an adhesive layer 24 may also be used to attach an anti-glare layer 26 onto the side of the first substrate 12 having the second transparent conductive layer 16 to cover the second transparent conductive layer 16. The adhesive layer 24 may be an optical clear adhesive (OCA) with a thickness of about 100 μm or less than 100 μm as an example, and the thickness of the anti-glare layer 26 may be about 100 μm for example. Accordingly, the touch panel 22 of the present invention touch-control display 10 may include one single layer of sensor layer 20, an adhesive layer 24 and an anti-glare layer 26. In a different embodiment, the anti-glare layer 26 or the protection layer on the sensor layer 20 may be omitted.

For forming the display panel, a display medium layer 28 and a display electrode layer 30 are successively formed on a side of the first transparent conductive layer 14 opposite to the first substrate 12 such that the first transparent conductive layer 14, the display medium layer 28 and the display electrode layer 30 compose a display panel 32. For instance, the display panel 32 may be an electrophoretic display panel, wherein the display medium layer 28 is an electrophoretic display layer, the first transparent conductive layer 14 serves as the common electrode layer of the display panel 32, and the display electrode layer 30 may include a plurality of switch elements or pixel electrodes for controlling the gray level performance of the display panel 32. In other embodiments, the display panel 32 may be other types of display panels. For instance, the display medium layer may be a liquid crystal layer or an organic light emitting layer, but not limited thereto.

Figure 3:
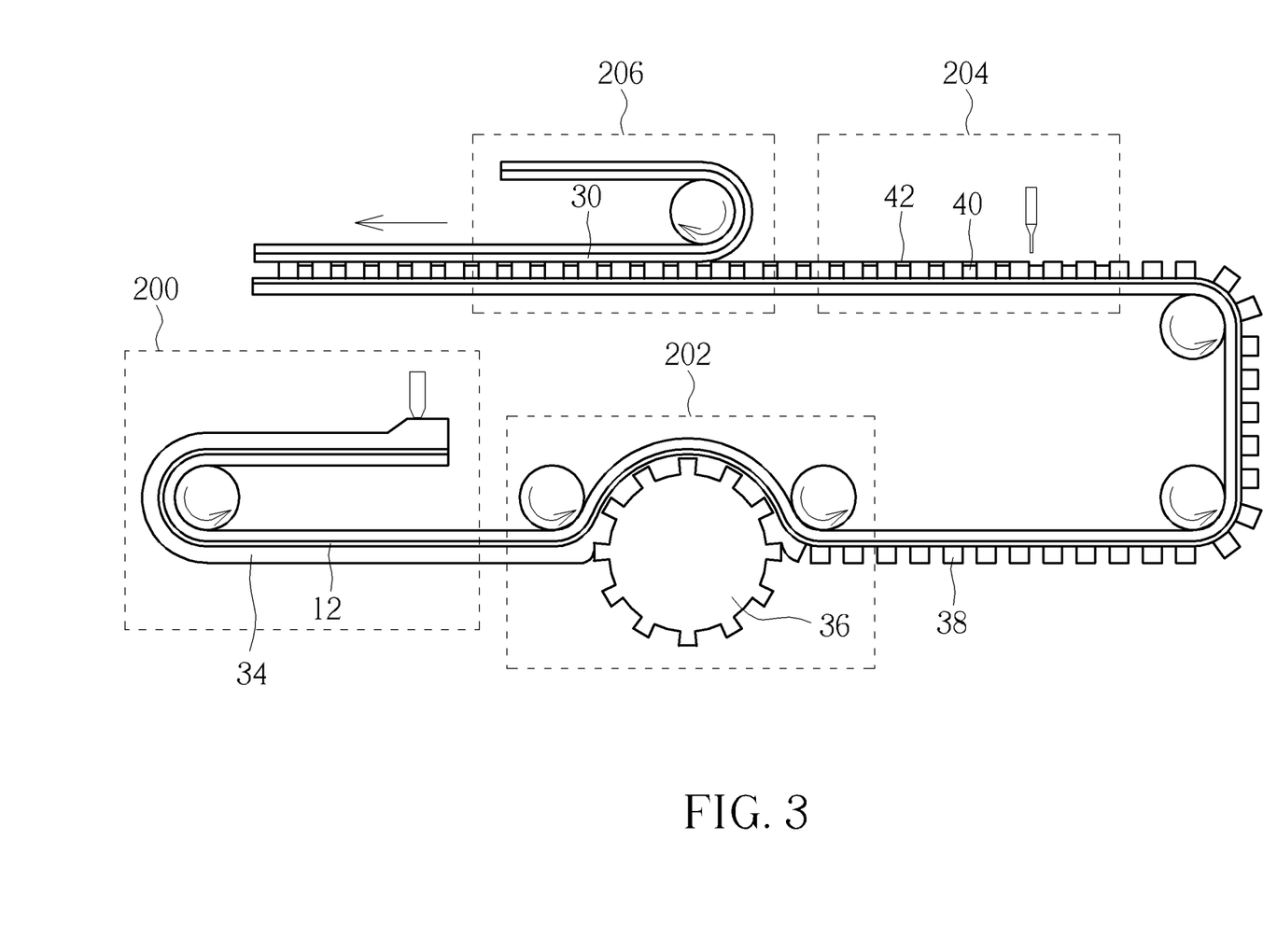
FIG. 3 is a schematic diagram of a roll-to-roll process of the fabrication method of the touch-control display according to the first embodiment of the present invention.

As an example, the formation of the display medium layer 28 may be performed by a roll-to-roll process, as shown in FIG. 3. In process step 200, a micro-cup material 34 may be formed on the side of the first substrate 12 having the first transparent conductive layer 14 through a coating process for instance. In process step 202, the micro-cup structures 38 arranged as an array may be embossed on the surface of the micro-cup material 34 by an embossing roller 36 through a micro-embossing process. In process 204, the electrophoretic material 40 is filled into the micro-cup structures and then the micro-cup structures 38 filled with the electrophoretic material 40 are sealed. For example, the seal layer is formed on the surfaces of the openings of the micro-cup structures 38, as shown in FIG. 3. In process step 206, a display electrode layer 30 with elements and pixel electrodes may be formed on the surfaces of the micro-cup structures 38 through roll-to-roll method in order to fabricate the display panel 32. After that, a cutting process may be adopted to cut the first substrate 12 into several portion with desired sizes to complete the fabrication of the present invention touch-control display 10.

Referring back to FIG. 2, the present invention touch-control display 10 fabricated through the above-mentioned method includes a first substrate 12, a display panel 32 and a touch panel 22. The display panel 32 and the touch panel 22 are respectively disposed on two opposite sides of the first substrate 12. For example, the display panel 32 and the touch panel 22 are disposed on the first surface 121 and the second surface 123 of the first substrate 12 respectively. In one aspect, the display panel 32 includes a first transparent conductive layer 14 which is disposed on the first surface 121 of the first substrate 12 and directly in contact with the first surface 121 of the first substrate 12, wherein the first transparent conductive layer 14 may serve as the common electrode of the display panel 32. The display panel 32 may further include a display medium layer 28 and a display electrode layer 30. The display medium layer 28 is disposed on a side of the first transparent conductive layer 14 opposite to the first substrate 12, and the display electrode layer 30 is disposed on a side of the display medium layer 28 opposite to the first transparent conductive layer 14. In this embodiment, the first substrate 12 may be considered as a part of the display panel 32, as shown in FIG. 2. In another aspect, the touch panel 22 includes a second transparent conductive layer 16 which is disposed on the second surface 123 of the first substrate 12 and directly in contact with the first substrate 12, wherein the second transparent conductive layer 16 serves as the sensor layer 20 of the touch panel 22.

In the touch-control display 10 of the first embodiment of the present invention, the first transparent conductive layer 14 on the first surface 121 of the first substrate 12 is used as the common electrode of the display panel 32, and the second transparent conductive layer 16 on the second surface 123 of the first substrate 12 is used as the sensor layer 20 of the touch panel 22. Therefore, an additional adhesive layer for fixing the separate touch panel to the display panel in a conventional touch-control display structure is not required anymore. As a result, at least the thickness of the adhesive layer (about 50 µm to 200 µm) and one of the substrates of the touch panel and the display panel can be saved. In a conventional touch-control display, the touch panel may be formed on an additional PET substrate that is attached on the display panel, and the thickness of a PET substrate may be about 125 µm or more, for instance. In another example, the touch panel may be formed on a glass substrate, whose thickness may be reach 300 µm or more, in a conventional touch-control display. Therefore, according to the touch-control display structure of the first embodiment of the present invention and related fabrication method, a thickness of 200 µm or more than 200 µm may be saved in contrast to the conventional touch-control display, thus the material cost can be saved too. Furthermore, to reduce the numbers of substrates and films can also improve the light transmittance efficiency of the display panel 32 and the display performance.

The touch-control display and the fabrication method thereof are not limited by the aforementioned embodiment, and may have other different preferred embodiments and variant embodiments. To simplify the description, the identical components in each of the following embodiments and variant embodiments are marked with identical symbols. For making it easier to compare the difference between the embodiments and variant embodiments, the following description will detail the dissimilarities among different embodiments and the identical features will not be redundantly described.

Figure 4:
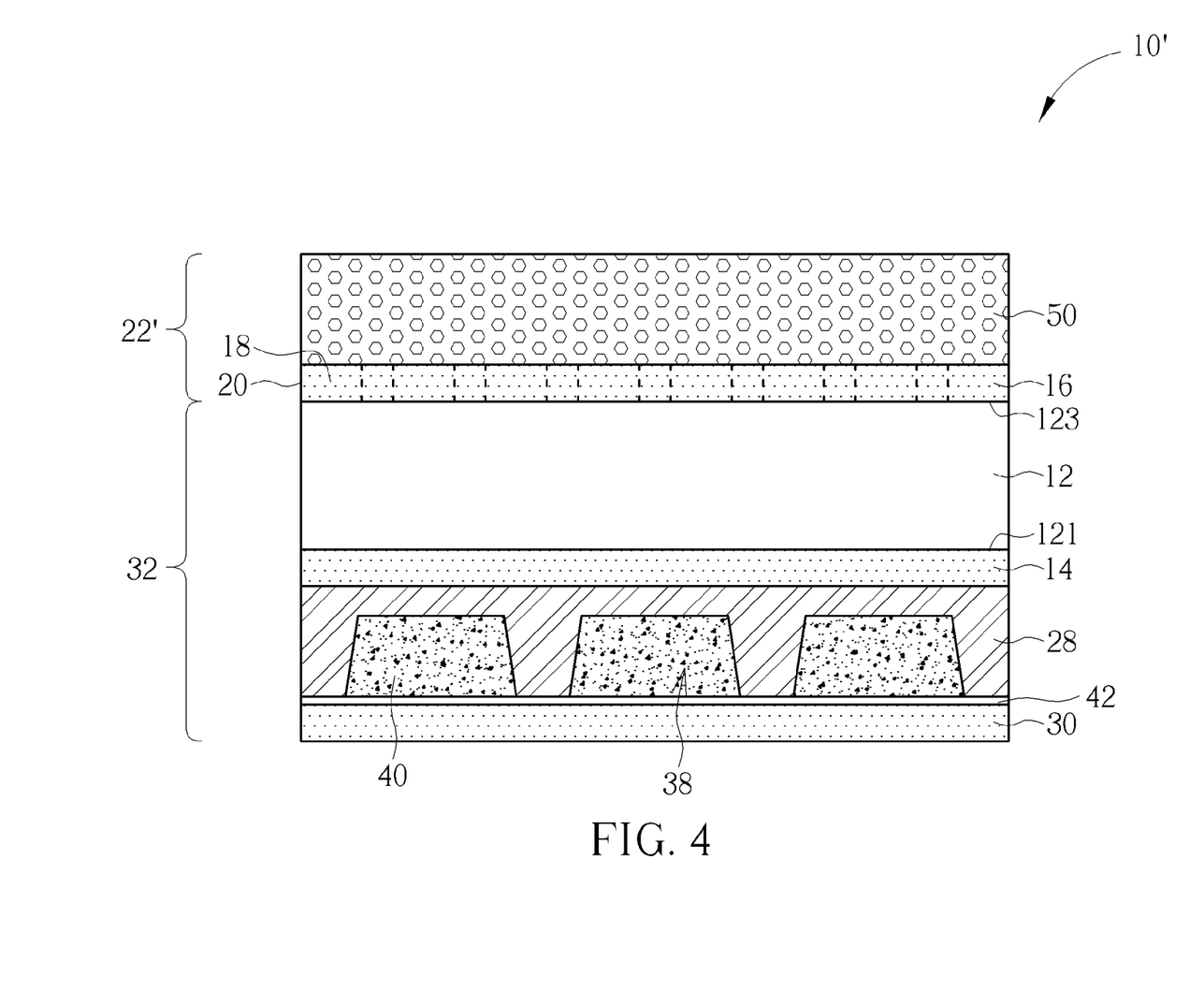
FIG. 4 is a schematic diagram of a structure of a touch-control display according to a variant embodiment of the first embodiment of the present invention.

Referring to FIG. 4, FIG. 4 is a schematic diagram of a structure of a touch-control display 10' according to a variant embodiment of the first embodiment of the present invention. Different from the first embodiment, the touch panel 22' of the touch-control display 10' does not include the above-mentioned adhesive layer and anti-glare layer on its surface. However, a slit coating process or other process may be adopted to form a protection layer 50 on the surface of the sensor layer 20, wherein the protection layer 50 includes transparent insulating material and preferably has a greater hardness in order to provide a protection function for the touch-control display 10'. The thickness of the protection layer 50 may be about 1 µm to 20 µm for example. According to this variant embodiment, the protection layer 50 may be formed on the surface of the second transparent conductive layer 16 after the patterning process of the second transparent conductive layer 16 is performed. Selectively, the protection layer 50 can be formed after the display panel 32 is fabricated.

Figure 5:
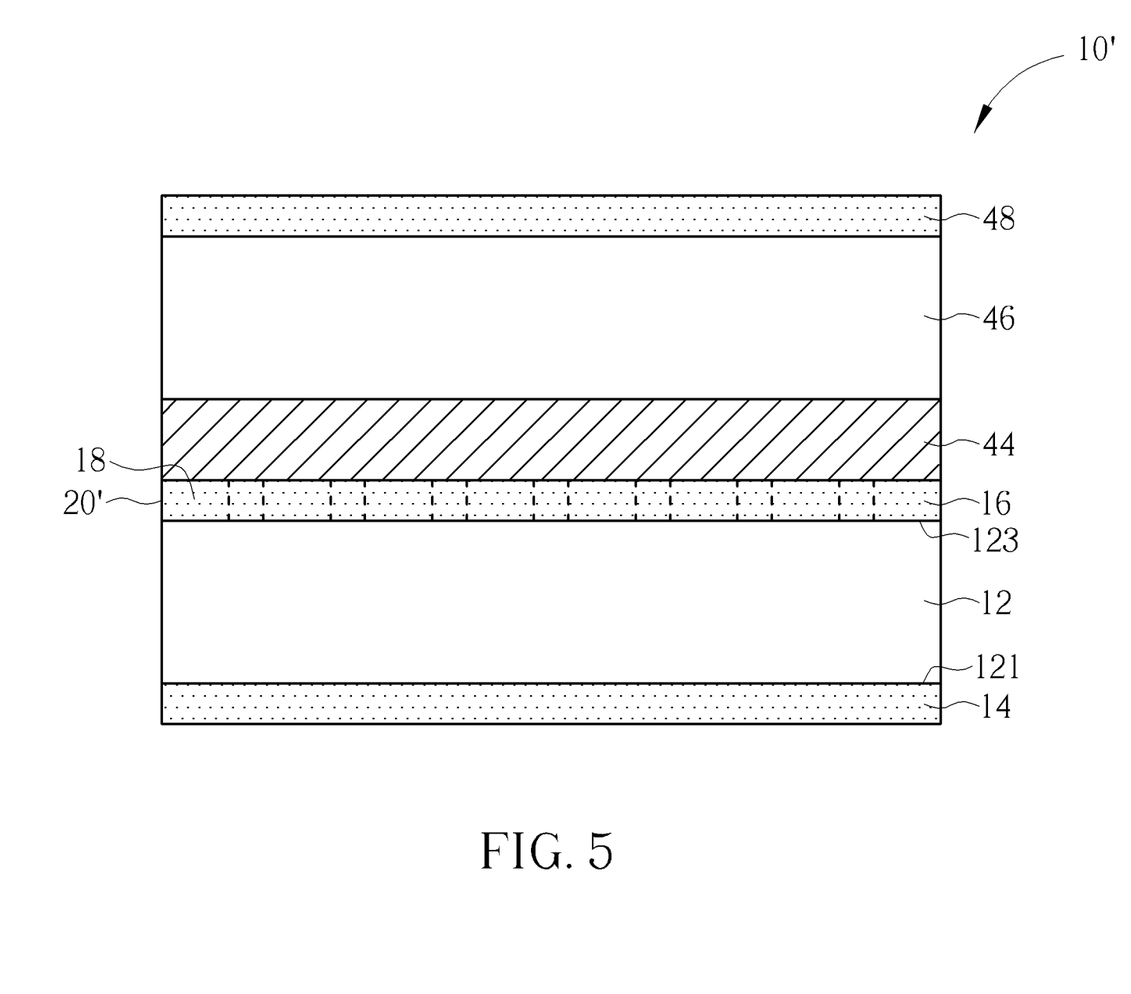
FIG. 5 to FIG. 6 are schematic diagrams of the processes of the fabrication method of a touch-control display according to a second embodiment of the present invention.
Figure 6:
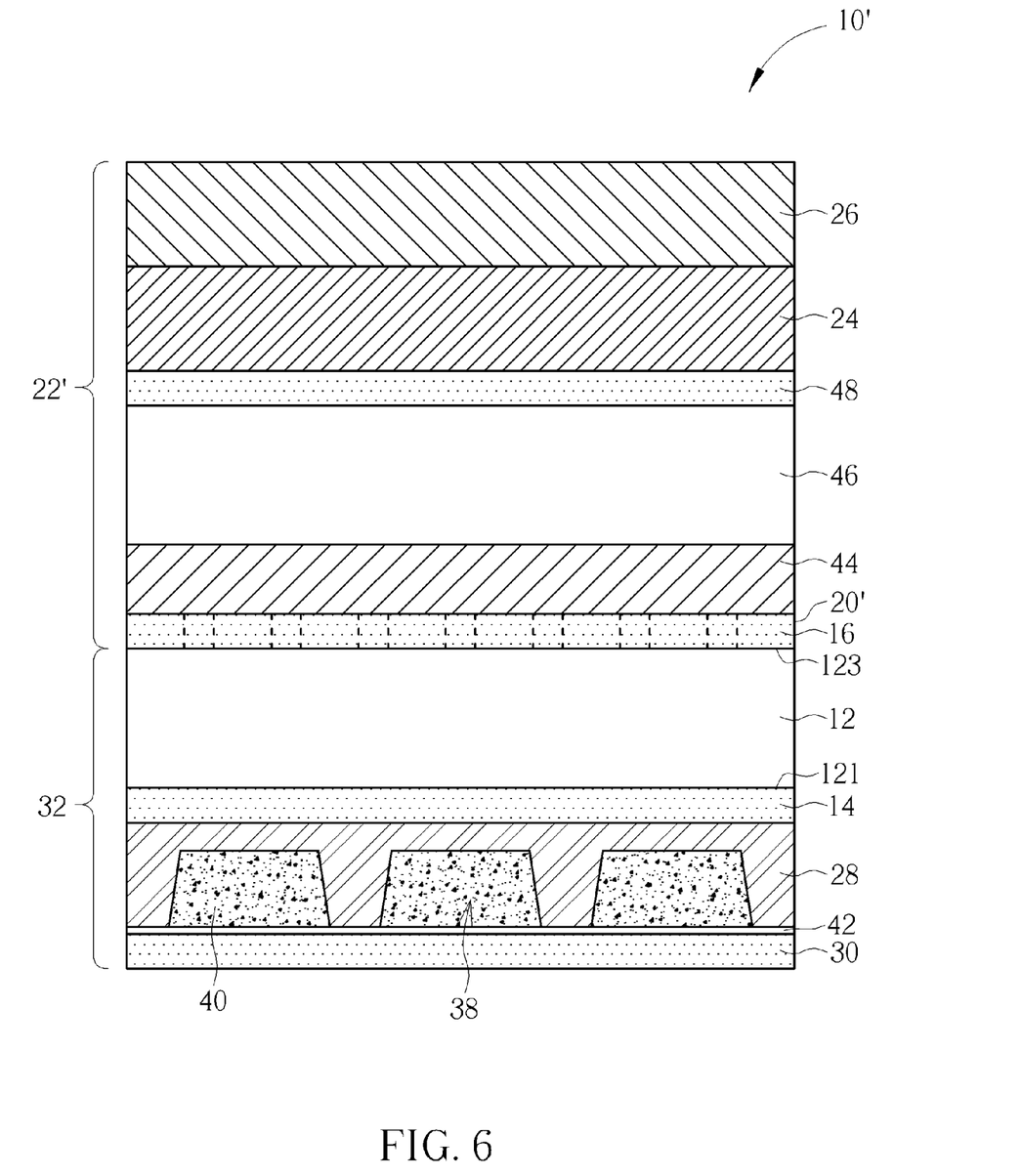

FIG. 5 to FIG. 6 are schematic diagrams of the processes of the fabrication method of a touch-control display according to a second embodiment of the present invention. In this embodiment, the touch panel 22' of the touch-control display 10' has two sensor layers. As shown in FIG. 5, similar to the first embodiment, after providing the first substrate 12 having the first transparent conductive layer and the second transparent conductive layer 16 thereon, a patterning process to the second transparent conductive layer 16 is performed to form a plurality of sensors 18 in the second transparent conductive layer 16 for manufacturing a first sensor layer, the sensor layer 20'. Then, a second substrate 46 with a third transparent conductive layer 48 thereon is selectively fixed on the surface of the second transparent conductive layer 16 opposite to the first substrate 12 by an adhesive layer 44. After that, a patterning process is performed to the third transparent conductive layer 48 to form a plurality of sensors (not shown) in the third transparent conductive layer 48 such that the third transparent conductive layer 48 can serve as a second sensor layer. The second substrate 46 may be a glass substrate or a flexible substrate and may have a thickness of about 125 µm to about 300 µm, for example. The adhesive layer 44 may be an optical clear adhesive and have a thickness of about 50 µm, for example. In other embodiments, the third transparent conductive layer 48 on the surface of the second substrate 46 can be patterned to form sensors in advance and then attached onto the second transparent conductive layer 16. In addition, in various embodiments, the third transparent conductive layer 48 may be fabricated on the second transparent conductive layer 16 through other process to replace being formed on the surface of the second substrate 46 in this embodiment.

Referring to FIG. 6, similar to the first embodiment, then the anti-glare layer 26 may be selectively attached onto the third transparent conductive layer 48 by using the adhesive layer 24, such that the second transparent conductive layer 16, the adhesive layer 44, the second substrate 46, the third transparent conductive layer 48, the adhesive layer 24 and the anti-glare layer 26 compose the touch panel 22'. In another aspect, on the side of the first transparent conductive layer 14 opposite to the first substrate 12, the display medium layer 28 and the display electrode layer 30 are successively formed, such that the first transparent conductive layer 14, the display medium layer 28 and the display electrode layer 30 compose a display panel 32, wherein the first transparent conductive layer 14 serves as the common electrode of the display panel 32.

Figure 7:
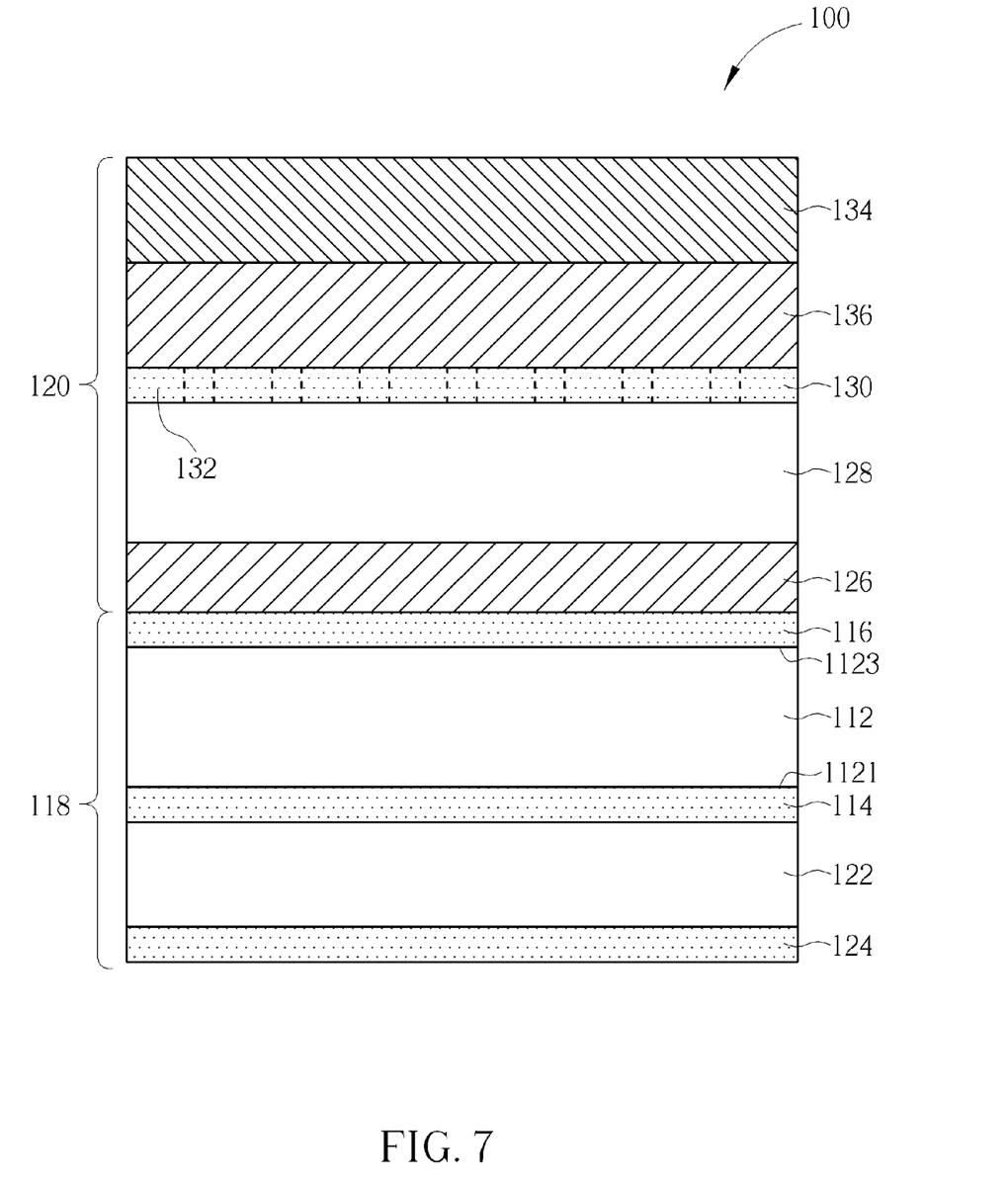
FIG. 7 is a schematic diagram of a sectional view of a touch-control display according to a third embodiment of the present invention.

FIG. 7 is a schematic diagram of a sectional view of a touch-control display according to a third embodiment of the present invention. In the touch-control display of this embodiment, the two transparent conductive layers on two sides of the transparent substrate respectively serve as the common electrode and the shielding layer of the display panel. Referring to FIG. 7, the touch-control display 100 of this embodiment includes a display panel 118 and a touch panel 120. The display panel 118 includes a first substrate 112, a first transparent conductive layer 114 and a second transparent conductive layer 116, wherein the first transparent conductive layer 114 and the second transparent conductive layer 116 are disposed on the first surface 1121 and the second surface 1123 of the first substrate 112 respectively. The first substrate 112 may be a flexible substrate or a glass substrate. The first transparent conductive layer 114 and the second transparent conductive layer 116 may include materials of ITO, IZO, AZO, ITZO, ZnO, TZO, a combination of the above-mentioned materials, or any other transparent conductive material. Furthermore, the first transparent conductive layer 114 and the second transparent conductive layer 116 may have the same or different materials. The display panel 118 further includes a display medium layer 122 and a display electrode layer 124 disposed on the surface of the first transparent conductive layer 114 in order. The first transparent conductive layer 114 may serve as the common electrode of the display panel 118. The display medium layer 122 may be any kind of display materials, such as an electrophoretic layer, a liquid crystal layer, and an organic light emitting layer, but not limited thereto. The touch panel 120 can be fixed on the display panel 118 by selectively attaching the second substrate 128 onto the surface of the second transparent conductive layer 116 through an adhesive layer 126, wherein a third transparent conductive layer 130 is disposed on the second substrate 128. The third transparent conductive layer 130 may serve as the sensor layer of the touch panel 120 and include a plurality of sensors 132. The touch panel 120 may selectively include an anti-glare layer 134 attached on the surface of the third transparent conductive layer 130 by an adhesive layer 136. The touch panel 120 of this embodiment only has one layer of touch-control element layer, includes the first sensor series extending along a first direction and the second sensor series extending along the second direction that isolated from and cross each other, for example. A plurality of bridge lines may be selectively formed on the surface of the third transparent conductive layer 130 such that the sensors 132 in each first sensor series along the first direction or each second sensor series along second direction are electrically connected to each other, but not limited thereto. For example, the sensors 132 of this embodiment may only include the sensor series extending along one single direction, such as the sensor series with triangle-like shapes or other various structures and arrangements of one-layer touch-control element. In other embodiments, the touch panel 120 may include two sensor layers, whose structures and relative arrangements may be as the two sensor layers, the second transparent conductive layer 16 and the third transparent conductive layer 48, shown in FIG. 6, but not limited thereto. It should be noted that the second transparent conductive layer 116 serves as the shielding layer of the display panel 118. When the touch-control display 100 is under operation, the second transparent conductive layer 116 may be floating, grounded, or be applied with a specific voltage, wherein the specific voltage is preferably less than or equal to the maximum driving voltage of the display panel 118 and greater than or equal to the minimum driving voltage of the display panel 118. As a result, the second transparent conductive layer 116 serving as the shielding layer can reduce the capacitance formed between the conductive elements of the touch panel 120 and the display panel 118, so as to improve the sensing performance of the touch panel 120 and reduce the noise of the display panel 118.

According to the third embodiment of the present invention, the fabrication method of the touch-control display 100 includes providing a first substrate 112 that has the second transparent conductive layer 116 and the first transparent conductive layer 114 disposed on two opposite surfaces of the first substrate 112 respectively, and then successively forming the display medium layer 122 and the display electrode layer 124 on the side of the first transparent conductive layer 114 opposite to the first substrate 112 such that the first transparent conductive layer 114, the display medium layer 122 and the display electrode layer 124 compose the display panel 118. In another aspect, a second substrate 128 is provided to be disposed on the second transparent conductive layer 116, wherein the second substrate 128 has the third transparent conductive layer 130 disposed on the side of the second substrate 128 opposite to the second transparent conductive layer 116. Then, a patterning process is performed to the third transparent conductive layer 130 to form sensors 132 in the third transparent conductive layer 130. Therefore, the second substrate 128 and the third transparent conductive layer 130 compose the touch panel 120. However, the patterning process to the third transparent conductive layer 130 may be performed before attaching the second substrate 128 onto the second transparent conductive layer 116 in other embodiments. Furthermore, an anti-glare layer 134 may be selectively attached to the third transparent conductive layer 130 by an adhesive layer 136 in this embodiment. It should be noted that the touch panel 120 may be fabricated before forming the display panel 118 in other embodiments.

In conclusion, according to the present invention touch-control display, the two transparent conductive layers formed on two different sides of the first substrate are used as the electrode elements or devices of the touch panel and the display panel respectively; alternatively, one of the two transparent conductive layers is used as the shielding layer. With comparison to the conventional technology, at least one substrate and one adhesive layer are omitted in the present invention touch-control display save, such that the whole thickness of the apparatus can be effectively reduced and the light transmittance efficiency is raised. In addition, when the transparent conductive layer is used as the shielding layer, the sensing performance of the touch panel and the display performance of the display panel can be improved at the same time.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A fabrication method of a touch-control display, comprising:

providing a first substrate, wherein a first transparent conductive layer and a second transparent conductive layer are pre-fabricated and blanketly formed on two opposite surfaces of the first substrate with no patterning process, the second transparent conductive layer being disposed above the first transparent conductive layer;

after providing the first substrate with the first transparent conductive layer and the second transparent conductive layer, performing a patterning process to the second transparent conductive layer disposed on the first substrate to form a plurality of sensors in the second transparent conductive layer so that the second transparent conductive layer serves as the sensor layer of a touch panel; and after providing the first substrate with the first transparent conductive layer and the second transparent conductive layer, successively forming a display medium layer and a display electrode layer on a side of the first transparent conductive layer opposite to the first substrate such that the first transparent conductive layer, the display medium layer and the display electrode layer compose a display panel.

2. The fabrication method of the touch-control display of claim 1, further comprising forming a protection layer on a side of the first substrate having the second transparent conductive layer before forming the display medium layer and the display electrode layer, the protection layer covering the second transparent conductive layer.

3. The fabrication method of the touch-control display of claim 1, further comprising:
    after the patterning process, providing a second substrate having a third transparent conductive layer disposed thereon; and
    using an adhesive layer to attach the second substrate onto the second transparent conductive layer, wherein the third transparent conductive layer is disposed on a side of the second substrate opposite to the second transparent conductive layer.

4. The fabrication method of the touch-control display of claim 1, further comprising using an adhesive layer to attach an anti-glare layer onto a side of the first substrate having the second transparent conductive layer, the anti-glare layer covering the second transparent conductive layer.

5. The fabrication method of the touch-control display of claim 1, further comprising forming a protection layer on a side of the first substrate having the second transparent conductive layer after the display panel is formed, the protection covering the second transparent conductive layer.

6. The fabrication method of the touch-control display of claim 1, wherein the first transparent conductive layer is not patterned before performing the patterning process to the second transparent conductive layer.

* * * * *